United States Patent
Sabulsky et al.

(10) Patent No.: US 9,405,932 B2
(45) Date of Patent: Aug. 2, 2016

(54) USER CENTRIC DATA MAINTENANCE

(71) Applicant: Microsoft Technology Licensing, LLC, Redmond, WA (US)

(72) Inventors: Jacob Andrew Sabulsky, Kirkland, WA (US); Christopher Scott Dickens, Issaquah, WA (US); Zainab Hakim, Sammamish, WA (US); Harris Syed, Redmond, WA (US); Axel Andrejs, Sammamish, WA (US); John Saxon Morrow, Seattle, WA (US); Ranjib Singh Badh, Sammamish, WA (US); Sarjana Sheth, Redmond, WA (US); Sermet Iskin, Issaquah, WA (US); Manoj Kumar Biswas, Bellevue, WA (US); Sashi Raghupathy, Redmond, WA (US); Jayaraman Kalyana Sundaram, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/901,743

(22) Filed: May 24, 2013

(65) Prior Publication Data
US 2014/0351958 A1  Nov. 27, 2014

(51) Int. Cl.
*G06F 21/62* (2013.01)
*G06F 21/78* (2013.01)

(52) U.S. Cl.
CPC .............. *G06F 21/629* (2013.01); *G06F 21/62* (2013.01); *G06F 21/6245* (2013.01); *G06F 21/78* (2013.01)

(58) Field of Classification Search
CPC .. H04L 67/306; G06Q 10/1053; G06Q 50/01; G06Q 10/10; G06F 21/62; G06F 21/51; G06F 21/575; G06F 21/78; G06F 2221/2129; G06F 2221/2153; G06F 21/629; G06F 21/6245
USPC .............................................. 726/3–6, 18, 30
See application file for complete search history.

(56) References Cited

U.S. PATENT DOCUMENTS 5,583,917 A  12/1996  Jonsson
8,086,676 B2  12/2011  Palahnuk et al.
(Continued)

FOREIGN PATENT DOCUMENTS

JP  2010128554 A  6/2010

OTHER PUBLICATIONS

"Best Practices for Integrating OS X with Active Directory", Retrieved at <<http://training.apple.com/pdf/wp_integrating_active_directory_ml.pdf>>, In Apple Technical White Paper, Retrieved date: Apr. 16, 2013, pp. 14.
(Continued)

*Primary Examiner* — Don Zhao
(74) *Attorney, Agent, or Firm* — Timothy Churna; Sade Fashokun; Micky Minhas (57) ABSTRACT

One or more techniques and/or systems are provided for dynamically maintaining user centric data. For example, a data provider app may have knowledge about user centric data associated with a user (e.g., a social network app may have contact information for a social network friend of the user). A user centric profile may be defined for the user centric data based upon information provided by the data provider app (e.g., a contact card may be generated for the social network friend). Responsive to receiving a request for the user centric profile from a requestor app (e.g., an event planning app), the user centric profile may be exposed to the user but not to the requestor app for security and/or privacy purposes. For example, an operating system may present at least some of the user centric profile within an operating system user interface.

20 Claims, 10 Drawing Sheets

(56) References Cited

U.S. PATENT DOCUMENTS

| | | | |
|---|---|---|---|
| 8,126,439 | B1 | 2/2012 | Sankaranaraynan |
| 8,201,230 | B2* | 6/2012 | Day .................. G06F 21/62 382/115 |
| 8,296,413 | B2 | 10/2012 | Bornhoevd et al. |
| 8,732,026 | B2 | 5/2014 | Caballero |
| 8,949,311 | B2 | 2/2015 | Perham |
| 2003/0120725 | A1 | 6/2003 | Chung |
| 2003/0192033 | A1 | 10/2003 | Gartside |
| 2004/0203851 | A1 | 10/2004 | Vetro et al. |
| 2004/0210906 | A1* | 10/2004 | Beresnevichiene et al. .. 719/310 |
| 2004/0225952 | A1 | 11/2004 | Brown |
| 2005/0036509 | A1* | 2/2005 | Acharya et al. ............... 370/466 |
| 2005/0060561 | A1* | 3/2005 | Pearson et al. ................ 713/194 |
| 2005/0188208 | A1* | 8/2005 | Day ...................... G06F 21/629 713/182 |
| 2005/0220080 | A1 | 10/2005 | Ronkainen et al. |
| 2006/0224611 | A1 | 10/2006 | Dunn et al. |
| 2007/0079142 | A1* | 4/2007 | Leone et al. .................. 713/193 |
| 2007/0136746 | A1 | 6/2007 | Bae et al. |
| 2007/0168490 | A1 | 7/2007 | Kent |
| 2007/0233647 | A1* | 10/2007 | Rawat et al. ...................... 707/3 |
| 2007/0261114 | A1 | 11/2007 | Pomerantsev |
| 2008/0016231 | A1 | 1/2008 | Itabashi et al. |
| 2009/0024944 | A1* | 1/2009 | Louch et al. .................. 715/765 |
| 2009/0125584 | A1* | 5/2009 | Agrawala et al. ............. 709/203 |
| 2010/0082652 | A1 | 4/2010 | Jones |
| 2010/0110910 | A1 | 5/2010 | Erceg |
| 2011/0225293 | A1 | 9/2011 | Rathod |
| 2012/0166544 | A1 | 6/2012 | Wilder |
| 2012/0233253 | A1 | 9/2012 | Ricci |
| 2012/0246742 | A1 | 9/2012 | Tresanti |
| 2013/0007050 | A1* | 1/2013 | Work ............................ 707/769 |
| 2013/0024944 | A1 | 1/2013 | Sasaki |
| 2013/0054701 | A1* | 2/2013 | Leeder et al. ................. 709/205 |
| 2013/0054803 | A1* | 2/2013 | Shepard et al. ............... 709/225 |
| 2013/0085861 | A1* | 4/2013 | Dunlap ...................... 705/14.58 |
| 2013/0282605 | A1* | 10/2013 | Noelting ........................ 705/321 |

OTHER PUBLICATIONS

Nelson, Tom, "Setting up Facebook with Mac OS X Mountain Lion or Later", Retrieved at <<http://macs.about.com/od/Mountain-Lion-Tips/qt/Setting-Up-Facebook-With-Mac-Os-X-Mountain-Lion-Or-Later.htm>>, Oct. 4, 2012, pp. 3.

Hollington, Jesse, "Facebook Contact and Calendar Integration in iOS 6", Retrieved at <<http://www.ilounge.com/index.php/articles/comments/facebook-contact-and-calendar-integration-in-ios-6/>>, Oct. 18, 2012, pp. 5.

Spidle, Jason, "How to Integrate Google Calendar Into Ubuntu", Retrieved at <<http://www.ehow.com/how_5664985_integrate-google-calendar-ubuntu.html>>, Feb. 5, 2010, pp. 4.

"OS X Its what makes a Mac a Mac", Retrieved at <<http://www.apple.com/macbookair/osx.html>>, Retrieved date: Apr. 15, 2013, pp. 5.

Staff, Macworld, "Mountain Lion: What You Need to Know", Retrieved at <<http://www.macworld.com/article/1165460/mountain_lion_what_you_need_to_know.html>>, Jun. 13, 2012, pp. 16.

Warren, Christina, "iOS 6: Everything You Need to Know", Retrieved at <<http://mashable.com/2012/06/11/ios-6-revaled/>>, Jun. 11, 2012, pp. 8.

Xiong, et al., "Preserving Data Privacy in Outsourcing Data Aggregation Services", Retrieved at <<http://www.cc.gatech.edu/~lingliu/papers/2007/toit07.pdf>>, In Journal of ACM Transactions on Internet Technology (TOIT)—Special Issue on the Internet and Outsourcing, vol. 7, Issue 3, Aug. 2007, pp. 27.

Katz, et al., "A Scalable Service Architecture for Computer-Telephony Integration", Retrieved at <<http://bnrg.cs.berkeley.edu/~randy/Papers/IEEECommMag99g.pdf>>, Retrieved Date: Mar. 7, 2013, pp. 21.

Sanchez-Nielsen, et al., "Mobile and Dynamic Web Services", Retrieved at <<http://ceur-ws.org/Vol-234/paper8.pdf>>, In Proceedings of the ECOWS, Dec. 2006, pp. 16.

Pauty, et al., "Research Challenges in Mobile and Context-Aware Service Development", Retrieved at <<http://davy.preuveneers.be/publications/frcss06.pdf>>, In Conference on Future Research Challenges for Software and Services, Apr. 1, 2006, pp. 11.

Int. Search Report cited in PCT Application No. PCT/US2013/060494 dated Feb. 7, 2014, 11 pgs.

Int. Search Report cited in PCT Application No. PCT/US2013/060499 dated Jul. 25, 2014, 10 pgs.

"Android Fundamentals and Components", Jan. 27, 2014, Internet Article, reprinted from the Internet at: http://techblogon.com/android-fundamentals-comonents-activity-service-broadcast-receiver-content-provider, 6 pgs.

"Intentes and Intent Filters", May 1, 2013, Internet Article, reprinted from the Internet at: http://developer.android.com/guide/components/intents-filters.html, 11 pgs.

"Unlocking Android: A Developer's Guide", Apr. 28, 2009, Frand Ableson, Charlie Collins and Robi Sen, Manning Publications Series, Safari Books Online, 49 pgs.

* cited by examiner

USER CENTRIC DATA MAINTENANCE

BACKGROUND

Many users may maintain user centric data with various services. In an example, a user may maintain an email contact list with a personal email service accessible through a personal email app and/or a personal email website. In another example, a user may maintain a work calendar with a work productivity service. The work calendar may comprise event data, calendar entries, tasks, email data, and/or a variety of other user centric data. In another example, a user may maintain a social network profile with a social network service. The social network profile may correspond to a social network friend list, social network messages, a social network calendar, social network profiles, social network posts, and/or a variety of other user centric data. Such services may be accessible through apps, such as the personal email app, a social network app, a work productivity app, etc. Aggregating and/or sharing user centric data between apps may be useful, but may pose security and/or privacy risks (e.g., a spam application may utilize personal information exposed by another app to spam other users or cause other problems).

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for dynamically maintaining user centric data are provided herein. For example, a user may be associated with first user centric data (e.g., a social network friend contact, an email address book entry, a task, event information, a social network profile, a user calendar entry, and/or a plethora of other user defined data). A data provider app may have knowledge regarding the first user centric data. For example, a social network data provider app may be capable of accessing and/or defining social network user centric data maintained through a social network service. Accordingly, a first user centric definition for the first user centric data may be received from the data provider app (e.g., the social network data provider app may specify, through the first user centric definition, a social network friend list, social network messaging information, social network calendar information, and/or other user centric data maintained with the social network service). In an example, the data provider app may specify access criteria for portions of the first user centric data (e.g., a social security number may be merely accessible to an operating system user interface, a photo may be accessible to a particular requestor app (e.g., after the particular requestor app successfully satisfies a validation process), a user name may be accessible to any requestor app, etc.).

A first user centric profile may be defined for the first user centric data based upon the first user centric definition. In an example, the first user centric profile may specify one or more user contacts associated with the user centric data (e.g., an email address, a social network ID, a mailing address, a work phone number, and/or other information about Jane, a social network friend of the user). In another example, the first user centric profile may specify event information associated with the user centric data (e.g., party location address, invitee contact list, cake shop phone number, and/or other event information associated with a birthday party event hosted by the user). In another example, the first user centric profile may specify one or more calendar entries (e.g., information for an afternoon work meeting). It may be appreciated that in one example, a wide variety of user centric data may be specified as one or more profile parameters within the first user centric profile (e.g., an email address profile parameter for Jane, a social network ID profile parameter for Jane, and/or other profile parameters within a user centric profile for Jane). In some embodiments, user centric profiles may be created for respective user centric entities (e.g., a first user centric profile for a first user contact, a second user centric profile for a second user contact, a third user centric profile for a first event, a fourth user centric profile for a first calendar entry, etc.). In some embodiments, a user centric profile may correspond to multiple user centric entities (e.g., a first user centric profile may correspond to calendar entries of a current month for the user, tasks for the user, and/or other user centric data for the user).

In an example, the first user centric profile may be maintained and/or owned by a trusted source, such as an operating system, configured to restrict unauthorized access to the first user centric profile. The operating system may expose the first user centric profile to the user and/or may selectively provide merely a portion of the first user centric profile to an action facilitator app capable of performing an action upon the first user centric profile. In an example, a request may be received from a requestor app (e.g., the user may utilize an event planning app to plan a party). Responsive to the request corresponding to the first user centric profile (e.g., the request may comprise a query parameter such as a phone number for Jane), the first user centric profile or a portion(s) thereof may be exposed to the user of the requestor app, but may not be exposed to the requestor app. For example, a social network ID for Jane within the first user centric profile may be displayed to the user through an operating system user interface (e.g., the operating system user interface may be drawn within a requestor app interface of the event planning app, but may be inaccessible to the event planning app) without allowing the requestor app to access the social network ID. In this way, the user may access the first user centric profile, through the requestor app, without the requestor app having access to the first user centric profile. In some embodiments, one or more portions of the user centric profile may be exposed to the requestor app based upon the requestor app satisfying access criteria (e.g., while the same and/or different portions of the user centric profile may be exposed through an operating system user interface). For example, merely a photo, but not a social security number or other sensitive information, from a user centric profile may be exposed to the requestor app based upon the requestor app satisfying access criteria for the photo. In some embodiments one or more data provider apps that respectively provide different portions of the user centric profile may specify which portions of the user centric profile may be exposed to which requestor apps and/or respective access criteria for different requestor apps to be able to access different portions of the user centric profile. For example, a first requestor app may have to satisfy first criteria to be able to access a first portion of the user centric profile (e.g., where the first criteria is specified by a first data provider app that provided the first portion of the user centric profile), a second requestor app may have to satisfy second, different criteria to be able to access the first portion of the user centric profile (e.g., where the second criteria is specified by the first data provider app that provided the first portion of the user centric profile), the first requestor app and second requestor app may have to satisfy a third criteria to be able to access a second portion of user centric profile (e.g., where the third criteria is specified by a second data provider app that provided the second portion of the user centric profile), etc.

In some embodiments, the first user centric profile may be exposed to the user by facilitating an action that may be performed upon the first user centric profile. In an example of facilitating an action, the request from the requestor app may comprise a request to perform an action (e.g., a send message to a social network email address for Jane). The operating system may invoke an action facilitator app (e.g., an email application) to create a new email with Jane as the recipient so that the user may write an email to Jane. The operating system may merely pass the social network email address for Jane to the action facilitator app as opposed to the entire first user centric profile (e.g., the first user centric profile may comprise a social security number, a home address, and/or other personal information that may not be exposed to the email application). In another example of facilitating an action, an action that may be invokeable by the user upon the first user centric profile may be exposed to the user (e.g., call Jane). Responsive to selection of the action by the user, a first profile parameter (e.g., a phone number for Jane) within the first user centric profile may be provided to the action facilitator app for performance of the action (e.g., a phone app). In this way, user centric data may be maintained in a secure manner while still allowing the user to access the user centric data through a requestor app and/or perform actions upon the user centric data.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

Figure 1:
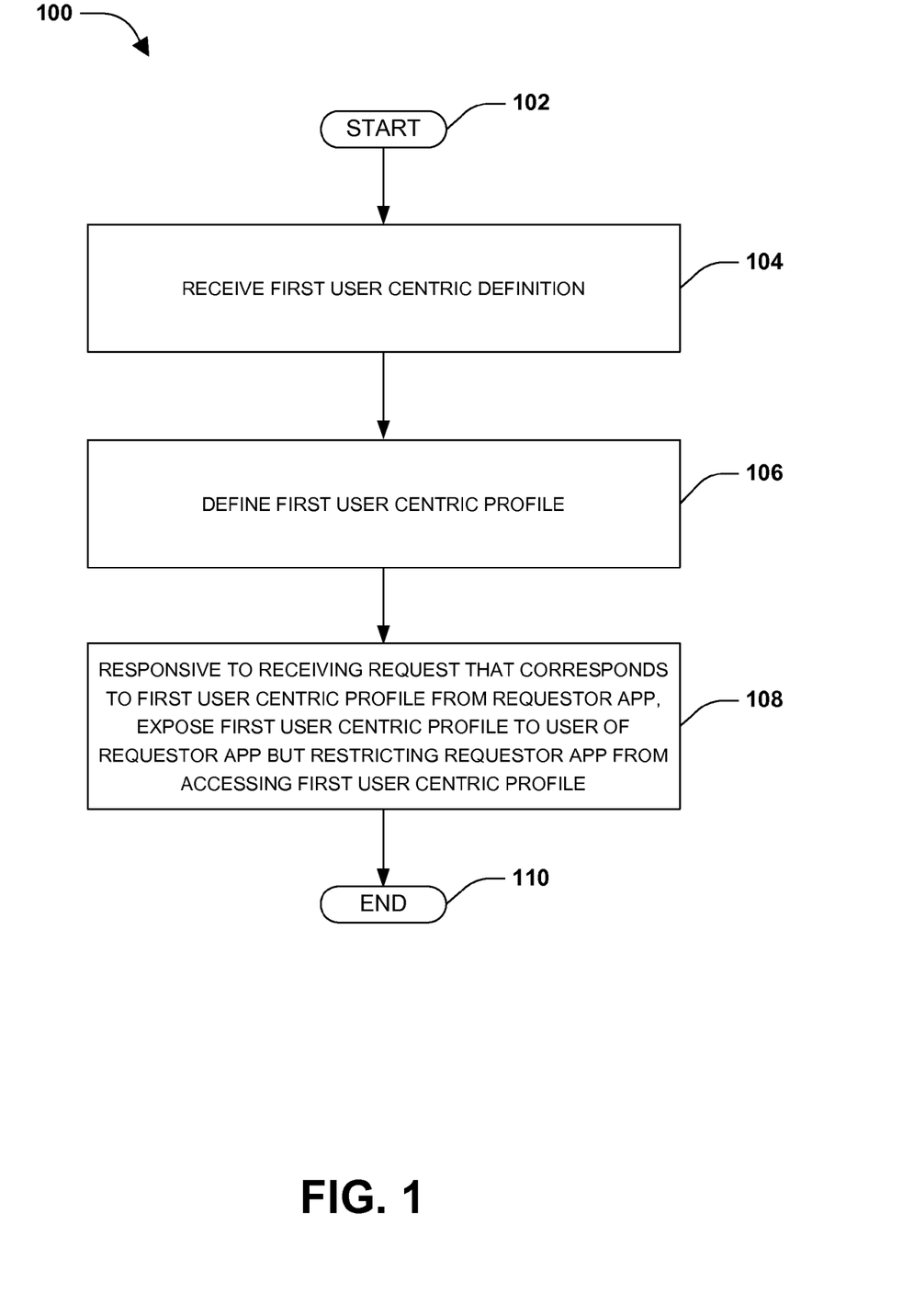
FIG. 1 is a flow diagram illustrating an exemplary method of dynamically maintaining user centric data.

An embodiment of dynamically maintaining user centric data is illustrated by an exemplary method 100 of FIG. 1. At 102, the method starts. In an example, a user may be associated with user centric data, such as a user contact, a user calendar entry, a social network user (e.g., a profile of a social network friend, a social network event, a social network message, a social network profile, a social network image, etc.), a user defined event (e.g., a party event, an oil change task, etc.), and/or user defined data. Because user centric data may be maintained by a variety of applications, websites, and/or services (e.g., a social network service, a personal email service, a photo sharing app, a microblogging app, a work calendar service, etc.), it may be advantageous to aggregate user centric data in an extensible manner (e.g., by allowing data provider apps to define, update, and/or remove user centric data maintained by an operating system as user centric profiles). In this way, user centric data may be brokered out to users and/or applications in a controlled and/or secure manner. For example, the operating system may function as a user centric data broker that operates as a gatekeeper as to which users and/or applications can access particular user centric data).

At 104, a first user centric definition for first user centric data may be received from a data provider app (e.g., through an XML file, through an operating system application programming interface (API) exposed to the data provider app, etc.). The data provider app may be authenticated for defining the first user centric data based, for example, upon an evaluation of an application manifest associated with the data provider app (e.g., a desktop application, a web service, a market place app, or other app may declare itself as a data provider capable of defining (e.g., providing) user centric data). In an example, a user may install a photo sharing application onto a mobile device (e.g., a tablet device, mobile phone, etc.). The photo sharing application may allow the user to access a photo sharing account maintained by a photo sharing service for the user. Thus, the photo sharing application may have access to and/or knowledge about the photo sharing account and/or actions that may be performed upon the photo sharing account through the photo sharing service (e.g., the user may be capable of posting a photo to a photo board of a friend contact that is a user of the photo sharing service). Accordingly, the photo sharing application may define the first user centric data through the first user centric definition. For example, the first user centric definition may specify that the user has the friend contact (e.g., a photo sharing user ID for the friend contact, a photo sharing service email address for the friend contact, a full name for the friend contact, etc.), and the photo sharing service is capable of posting a photo to the photo board of the friend contact on behalf of the user (e.g., a post photo action that may be performed by the photo sharing service that is accessible through an IP address and/or URL for the photo sharing application). It may be appreciated that a variety of information may be specified through the first user centric definition (e.g., the first user centric definition may specify a name, an address, a social network ID, a phone number, and/or a variety of other information for the friend contact), and that merely a few examples are provided for simplicity.

At 106, a first user centric profile may be defined for the first user centric data based upon the user centric definition. In an example, the first user centric profile may be maintained by a trusted source, such as an operating system. For example, the operating system may store the first user centric profile within an indexed user centric data store controlled by the operating system (e.g., the first user centric profile may be indexed such that a query may be performing using one or more query parameters, such as a query parameter corresponding to a name, an address, or other identifying information of the friend contact, in order retrieve the first user centric profile). Because the operating system controls the indexed user centric data store, the operating system may restrict unauthorized access to the first user centric profile. In this way, the operating system functions as a secure broker of user centric data (e.g., the indexed user centric data store may comprise a plurality of user centric profiles associated with the user, such as a user centric profile for a calendar event, a user centric profile for an email contact, etc.). In an example, the first user centric profile may comprise one or more profile parameters specified by one or more data provider apps (e.g., an email data provider app may define a work email for the friend contact for aggregation and/or inclusion within the first user centric profile; a video chat data provider app may define a video chat phone number for the friend contact for aggregation and/or inclusion within the first user centric profile; etc.). In an example, the first user centric profile may be updated based upon an update from the data provider app (e.g., a first profile parameter may be updated, a new profile parameter may be added, a second profile parameter may be removed, etc.).

The user may interact with a requestor app such as an event planning application that may allow the user to create a party event, create a guest list, create a to-do list, and/or perform other actions. In an example, the user may attempt to add the friend contact (e.g., the friend contact defined within the first user centric profile) to the guest list for notification of the party. At 108, a request may be received from the requestor app. The request may correspond to the first user centric profile. For example, the request may comprise a query parameter (e.g., an email address of the friend contact) that may be used to query the indexed user centric data store to identify the first user centric profile as defining the friend contact. Responsive to receiving the request corresponding to the first user centric profile, the first user centric profile may be exposed to the user of the requestor app, but the requestor app may be restricted from accessing the first user centric profile. It may be appreciated that the first user centric profile may be exposed to the user in a variety of manners such as visually displaying the first user centric profile (e.g., within an operating user interface owned by the operating system, but appearing to be associated with a requestor app user interface of the request app), providing an action that may be selected for performance upon the first user centric profile by the user (e.g., an action to post a party photo invite to the photo board of the friend contact), performance of an action specified within the request from the requestor app (e.g., the request may specify that a message is to be sent to a photo sharing service email address, unknown to the requestor app but specified within the first user centric profile, of the friend contact without requiring additional user input), etc.

In an example of exposing the first user centric profile, the operating system may display the first user centric profile through an operating system user interface (e.g., a user contact card, a calendar system component, a drop down list, a charm, an operating system interface tile of an operating system home screen, and/or other user interfaces controlled by the operating system). For example, the operating system may draw the operating system user interface within the requestor app interface of the requestor app such that at least some of the first user centric profile may appear to be provided by the requestor app, but is actually provided by the operating system in a secure manner where the requestor app does not have access to the first user centric profile. In an example, the first user centric profile may comprise a first profile parameter corresponding to a work email address for the friend contact and a second profile parameter corresponding to a personal email address for the friend contact. The first profile parameter may be visually displayed before the second profile parameter within the operating system user interface because the work email address may have been more recently used than the personal email address.

In another example of exposing the first user centric profile, an action invokeable by the user upon the first user centric profile may be presented. For example, a video chat action may be presented with a video chat phone number profile parameter through the operating system user interface. Responsive to selection of the action by the user, an action facilitator app capable of executing the action may be identified (e.g., a video chat app). A first profile parameter may be provided to the action facilitator app based upon the first profile parameter corresponding to the action (e.g., the video chat phone number profile parameter corresponds to the video chat action). In an example, a second profile parameter and/or other profile parameters not relevant to performing the video chat action may not be provided to the action facilitator app (e.g., the video chat app may be restricted from accessing a home address profile parameter for the friend contact). In this way, the user may view and/or perform various actions upon user centric data while selectively exposing merely relevant information to particular application(s) in a secure manner. At 110, the method ends.

Figure 2:
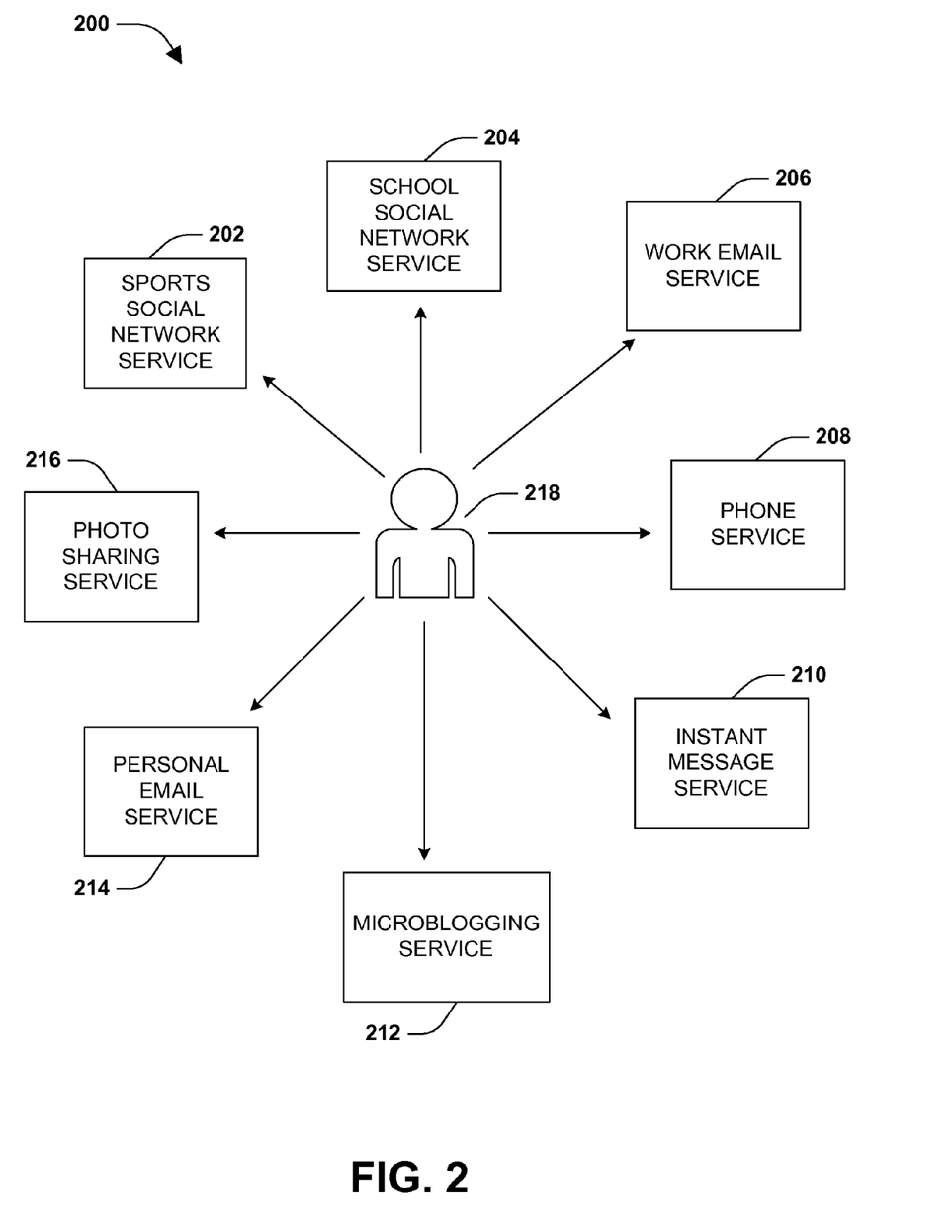
FIG. 2 is an illustration of an example of a user maintaining user centric data with multiple data sources, such as maintaining a user account with a service.

FIG. 2 illustrates an example 200 of a user 218 maintaining user centric data with multiple data sources, such as maintaining a user account with a service. The user 218 may have a first account with a sports social network service 202 where user centric data may correspond to contact information for friends within a friends list, sports events within a calendar of the user 218, etc. The user 218 may have a second account with a school social network service 204 where use centric data may correspond to contact information for friends within a friends list, social network profiles of the friends, messaging functionality, image sharing functionality, communication functionality, etc. The user 218 may have a third account with a work email service 206 where user centric data may correspond to an email address book, calendar events, a task list, etc. In this way, the user 218 may maintain user centric data through a wide variety of user accounts with various services, such as a phone service 208, an instant message service 210, a microblogging service 212, a personal email service 214, and/or a photo sharing service 216. It may be cumbersome for the user 218 to access the services using various websites, application, and/or account login information. For example, a user may browse to the sports social network website and login in order to access the first account. The user may separately browse to the school social network website and login in order to access the second account. The user may separately open a microblogging app to access the microblogging service. Thus, it may be advantageous to provide an aggregated service experience for the user in a secure and/or private manner, such as by utilizing an operating system as a user centric data broker for selectively providing access to user centric data.

Figure 3:
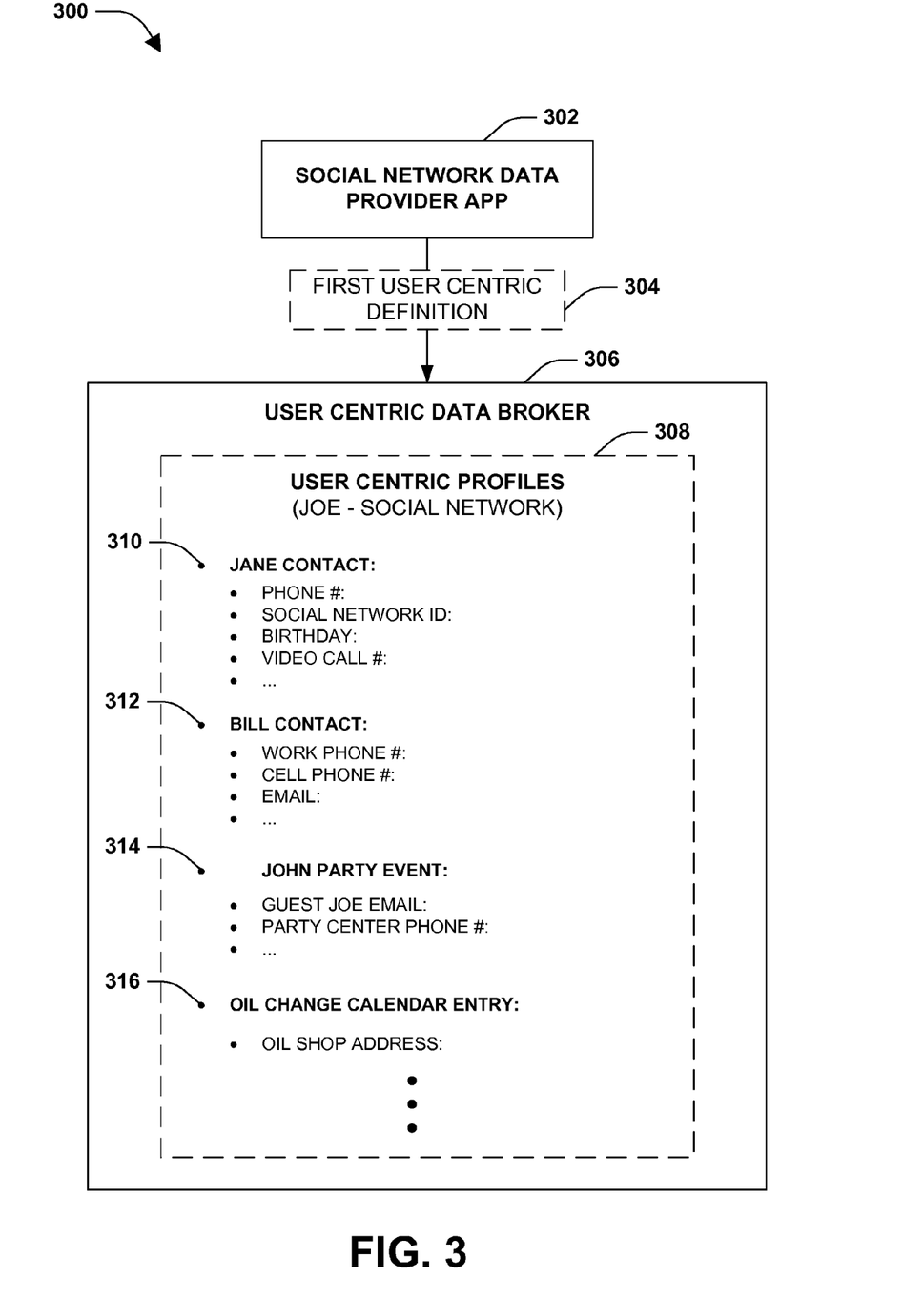
FIG. 3 is a component block diagram illustrating an exemplary system for dynamically maintaining user centric data.

FIG. 3 illustrates an example of a system 300 for dynamically maintaining user centric data. The system 300 may comprise a user centric data broker 306. In an example, the user centric data broker 306 may be owned by an operating system or other trusted source for brokering out user centric data. The user centric data broker 306 may receive a first user centric definition 304 from a social network data provider app 302. For example, the first user centric definition 304 may specify information about a user account for a user with a social network service (e.g., contact information for Jane whom is a friend of the user through the social network service, contact information for Bill whom is a friend of the user through the social network service, a John party event, an oil change calendar entry, and/or a variety of other user centric data). The user centric data broker 306 may define one or more user centric profiles 308 based upon the first user centric definition 304. In an example, a first user centric profile 310 may be defined based upon the contact information for Jane. The first user centric profile 310 may specify a phone number profile parameter, a social network ID profile parameter, a birthday profile parameter, a video call number profile parameter, and/or other user centric information associated with Jane. In another example, a second user centric profile 312 may be defined based upon the contact information for Bill. The second user centric profile 312 may specify a work phone number profile parameter, a cell phone number profile parameter, an email address profile parameter, and/or other user centric information associated with Bill. In another example, a third user centric profile 314 may be defined based upon the John party event. For example, the third user centric profile 314 may specify a guest Joe email address profile parameter, a party center phone number profile parameter, and/or other user centric data associated with the John party event. In another example, a fourth user centric profile 316 may be defined based upon the oil change calendar entry. The fourth user centric profile may specify an oil shop address profile parameter and/or other user centric data associated with the oil change calendar entry.

It may be appreciated that the first user centric definition 304 may be utilized to add to an existing user centric profile (e.g., multiple data provider apps may contribute to a single user centric profile). For example, a fifth user centric profile for George may have a work email address profile parameter previously specified by a work email data provider app based upon the user working with George. The first user centric definition 304 may specify a social network ID for George whom is a friend of the user. The user centric data broker 306 may add a social network ID profile parameter to the fifth user centric profile for George. In this way, the user centric data broker 306 may securely maintain user centric profiles for selective exposure to users and/or applications (e.g., where content, parameters, etc. of one or more user centric profiles may be derived from one or more sources, applications, etc.). It may be appreciated that the user centric data broker 306 may combine the contributions from multiple data provider apps into a single user centric profile (e.g., and/or may create separate user centric profiles (e.g., and specify a relationship(s) between one or more of the separate user centric profiles)). The user centric data broker 306 may provide data provider apps with selective access to portions of the user centric profile. For example, the user centric data broker 306 may provide data provider apps with access to portions of the user centric profile to which they contributed, but may restrict access to portions of the user centric profile to which they did not contribute. For example, a social network data provider app may be allowed to view, add, modify, delete, etc. a friends list of a user centric profile where the social network data provider app provided data for the friends list, but may restricted from accessing other aspects of the user centric profile to which the social network data provider app did not contribute. Similarly, other data provider apps that did not contribute to the friends list may not be allowed to access (e.g., view, add, modify, delete, etc.) the friends list.

Figure 4:
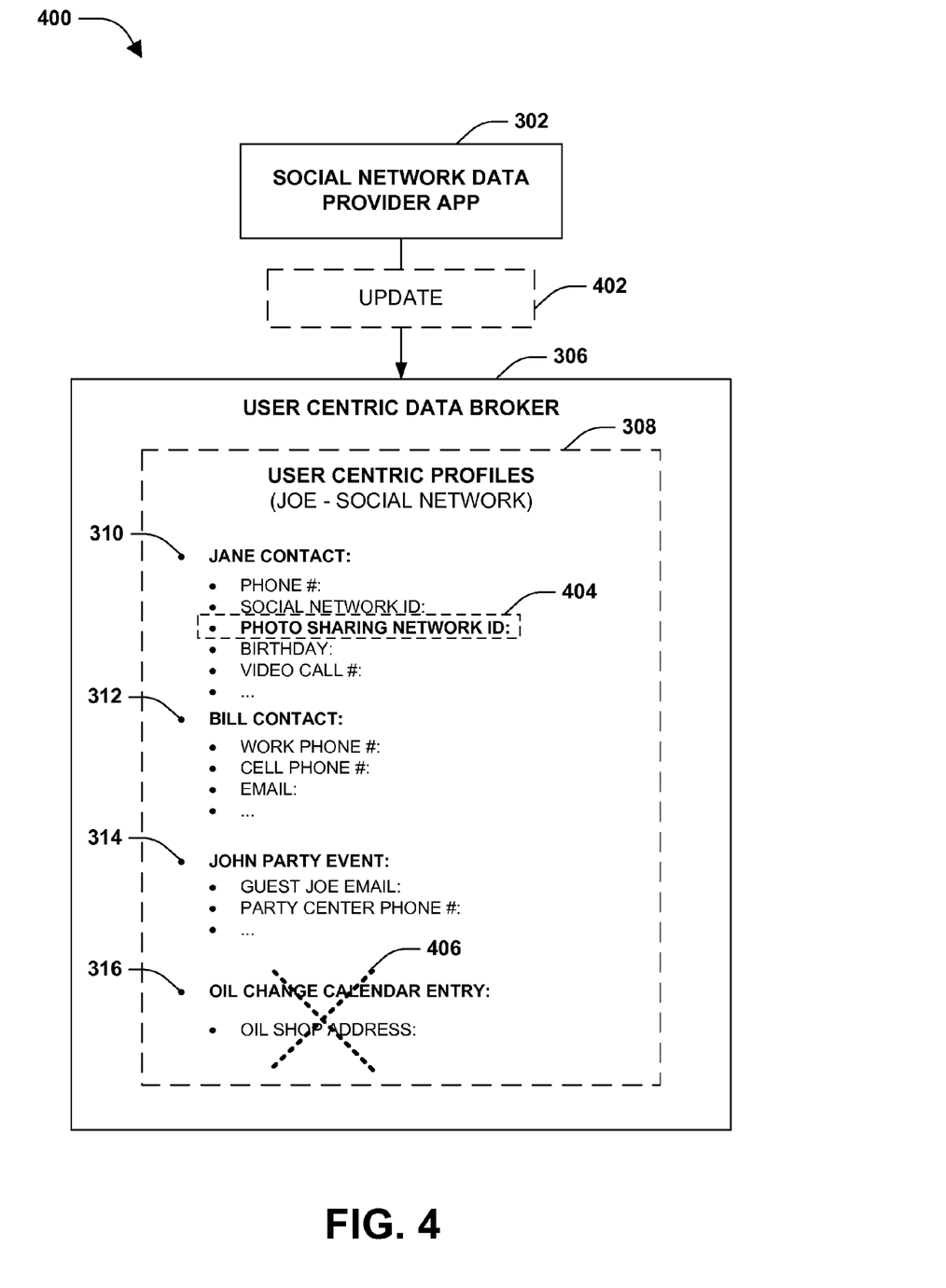
FIG. 4 is an illustration of an example of updating one or more user centric profiles.

FIG. 4 illustrates an example 400 of updating one or more user centric profiles 308 associated with a user. A user centric data broker 306 may have defined the one or more user centric profiles 308 based upon a first user centric definition provided by a social network data provider app 302 (e.g., FIG. 3). The user centric data broker 306 may receive an update 402 from the social network data provider app 302. In an example, the update 402 may correspond to a delete user centric profile update (e.g., a fourth user centric profile 316 may be deleted 406 because the user may have removed the oil change calendar entry from a social network service). In another example, the update may correspond to a modify user centric profile update (e.g., a first user centric profile 310 may be updated with a new profile parameter 404 specifying a photo sharing network ID for Jane whom is a friend of the user through the social network service).

Figure 5:
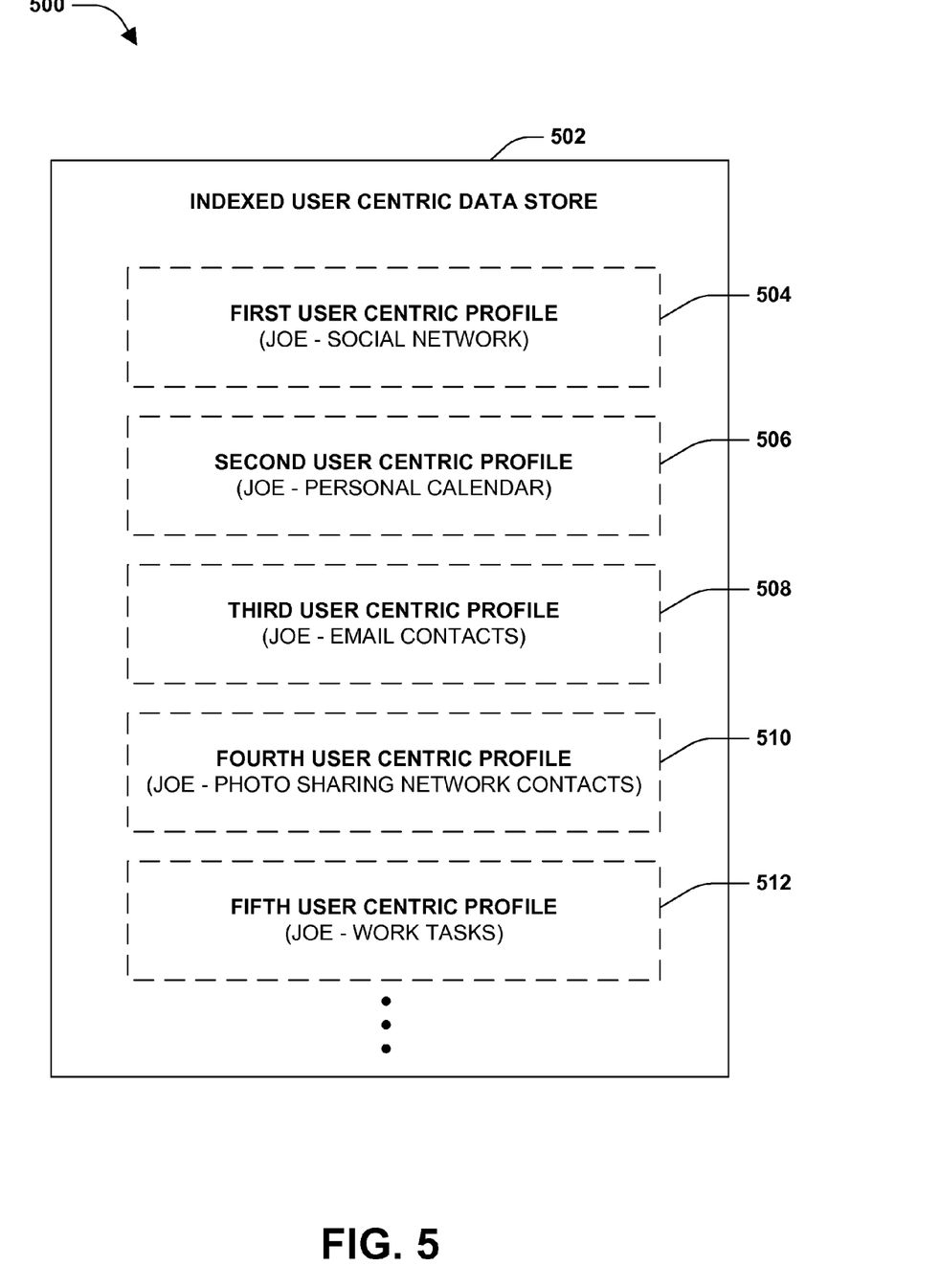
FIG. 5 is an illustration of an example of an indexed user centric data store.

FIG. 5 illustrates an example 500 of an indexed user centric data store 502. A user centric data broker may be configured to define and store user centric profiles within the indexed user centric data store 502 for later retrieval. For example, a query comprising one or more query parameters (e.g., an email address, a name, or other identifying information associated with user centric data) may be executed against the indexed user centric data store 502 in order to identify a matching user centric profile. The matching user centric profile may be exposed to a user (e.g., profile parameters may be displayed through a user interface drawn by the user centric data broker; an action invokeable by the user upon the user centric profile may be presented and/or facilitated, etc.). In an example, data from multiple related user centric profiles may be exposed based upon a relationship between such user centric profiles, such as a similar user relationship (e.g., when a match is identified within at least one of the multiple related user centric profiles). For example, if an email query matches a user centric profile for Joe (e.g., based upon an email contact), then other information related to Joe from one or more other user centric profiles associated with Joe may be exposed. The indexed user centric data store 502 may comprise user centric profiles corresponding to various user centric data, such as a first user centric profile 504 corresponding to social network information associated with a social network user account of Joe, a second user centric profile 506 corresponding to personal calendar data associated with a personal Calendar of Joe, a third user centric profile 508 corresponding to one or more email contacts associated with a user email account of Joe, a fourth user centric profile 510 corresponding to one or more photo sharing network contacts of Joe, a fifth user centric profile 512 corresponding to one or more work tasks of Joe, and/or other user centric profiles.

In an example, the user centric data broker and/or the indexed user centric data store 502 are owned and maintained by a trusted source, such as an operating system. The operating system may restrict unauthorized access to the indexed user centric data store 502. For example, when a user requests user centric data through a requestor app, the operating system may expose a user centric profile to the user but not to the requestor app (e.g., the operating system may display the user centric profile through an operating system user interface or the operating system may merely provide a relevant portion of the user centric profile to an action facilitator app capable of performing an action upon the user centric profile). In another example, at least a portion of the user centric profile may be provided to a requestor app, such as where the requestor app satisfies access criteria for that portion of the user centric profile (e.g., where the access criteria is specified by the data provider app that provided that portion of the user centric profile). In this way, user centric data may be securely stored within the indexed user centric data store 502 and/or exposed to the user or other application without unauthorized access or exposure of user centric data.

Figure 6:
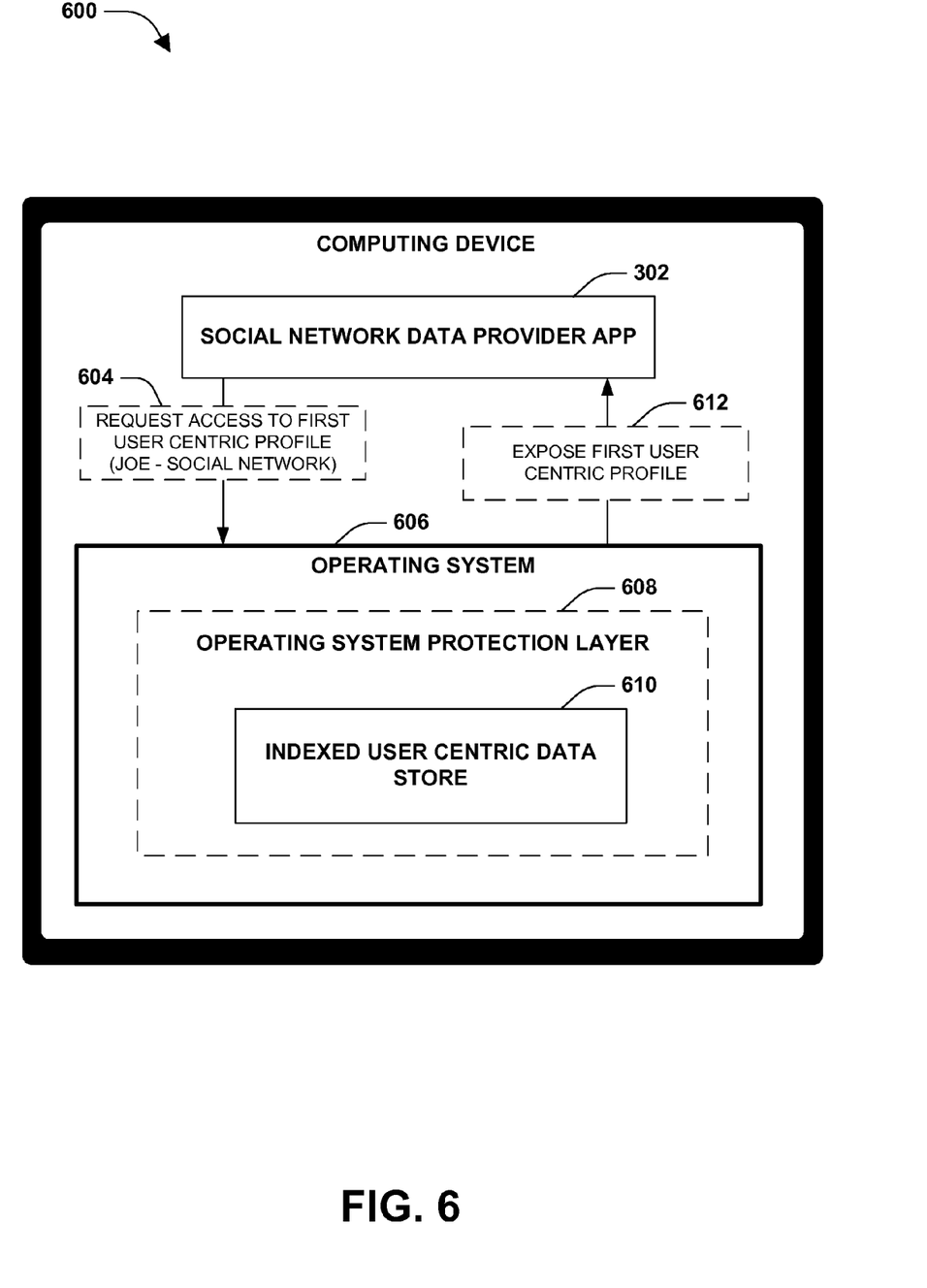
FIG. 6 is an illustration of an example of an operating system exposing a first user centric profile to a social network data provider app store.

FIG. 6 illustrates an example 600 of an operating system 606 exposing 612 a first user centric profile to a social network data provider app 302. That is, an operating system 606 (e.g., a user centric data broker) may maintain an indexed user centric data store 610 (e.g., 502 of FIG. 5). An operating system protection layer 608 of the operating system 606 may restrict unauthorized access to user centric profiles stored within the indexed user centric data store 610. In an example, the indexed user centric data store 610 comprises a first user centric profile defined by the operating system (e.g., the user centric data broker) based upon a first user centric definition provided by the social network data provider app 302.

In an example, a request 604 may be received from the social network data provider app 302. The request 604 may specify a request to access the first user centric profile within the indexed user centric data store 610. The operating system protection layer 608 may determine that the first user centric profile may have been defined by the social network data provider app 302 (e.g., the social network data provider app 302 may have "ownership" access or rights to the first user centric profile). According, the operating system 606 may expose 612 the first user centric profile or a relevant portion thereof to the social network data provider app 302.

Figure 7:
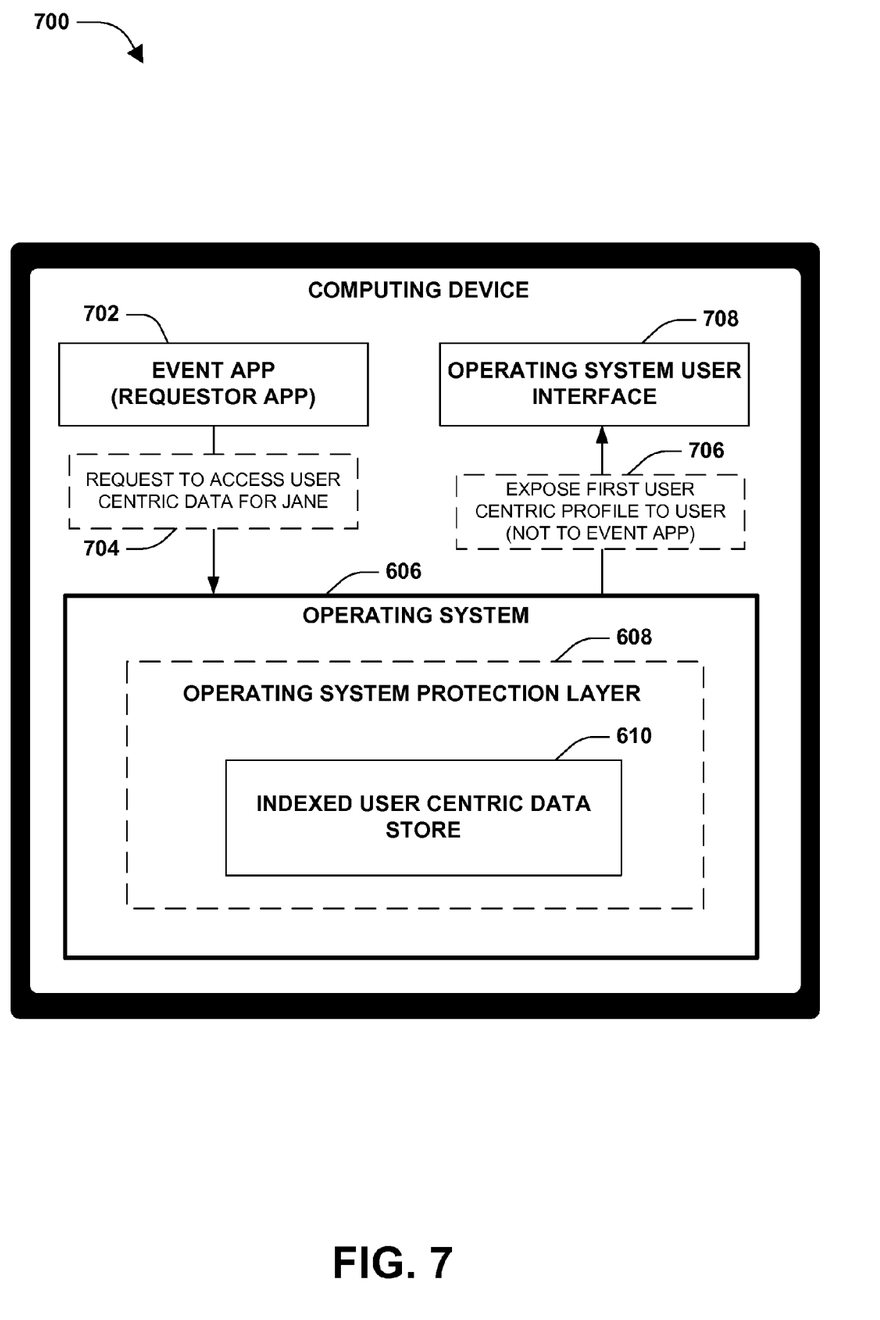
FIG. 7 is an illustration of an example of an operating system exposing a first user centric profile to a user but restricting a requestor app from accessing the first user centric profile.

FIG. 7 illustrates an example 700 of an operating system 606 exposing 706 a first user centric profile to a user but restricting a requestor app from accessing the first user centric profile. The operating system 606 (e.g., a user centric data broker) may maintain the first user centric profile and/or other user centric profiles within an indexed user centric data store 610. An operating system protection layer 608 may restrict unauthorized access to the indexed user centric data store.

In an example, a user of the operating system 606 may access the requestor app such as an event app 702 that may allow the user to perform various functionality associated with planning an event (e.g., creating a guest list, messaging guests, creating a to-do list, managing a party budget, etc.). The user may request to add Jane, a friend through a social work service, to the guest list. Because additional and/or useful contact information regarding Jane may be stored within the indexed user centric data store 610 (e.g., user centric data stored within a user centric profile for Jane may provide additional information about Jane not known by the event app 702 such as a social network email address), the event app 702 may send a request 704 to access user centric data, such as a user centric profile, for Jane. The request 704 may comprise a query parameter such as a name Jane, a phone number for Jane, and/or other information that may be used to identify a user centric profile for Jane. The operating system 606 (e.g., the user centric data broker) may query the indexed user centric data store 610 using the query parameter in order to identify a user centric profile corresponding to the query parameter (e.g., the first user centric profile may match the name Jane, and may comprise one or more profile parameters corresponding to user centric data for Jane such as a social network email address, a home address, a marital status, an image, etc.).

Because the event app 702 may or may not be trusted, the operating system 606 may expose 706 the first user centric profile to the user, but may restrict the event app 702 from accessing the first user centric profile. It may be appreciated that various techniques for exposing the first user centric profile to the user but not the event app may be performed and that merely a few examples are provided for simplicity. In an example, the operating system 606 may create an operating system user interface 708 within which the first user centric profile may be drawn by the operating system 606. The user may view and/or interact with the first user centric profile through the operating system user interface 708. Because the operating system 606 may control the operating system user interface 708, the first user centric profile may not be exposed to the event app 702 (e.g., the event app 702 may not have access to the first user centric profile even though the operating system user interface 708 may be displayed within a requestor app user interface of the event app 702, such as through a drop down list or a contact card). In an example, responsive to the user indicating that the social network email address for Jane is to be added to the event, merely the social network email address may be provided to the event app 702 (e.g., but not the home address, marital status, or image for Jane unless further requested by the user). In another example, responsive to the user indicating that an email invite is to be sent to Jane, then the operating system may merely expose the social network email address to an email application for completion of an email action (e.g., but not the home address, marital status, or image for Jane unless further requested by the user).

Figure 8:
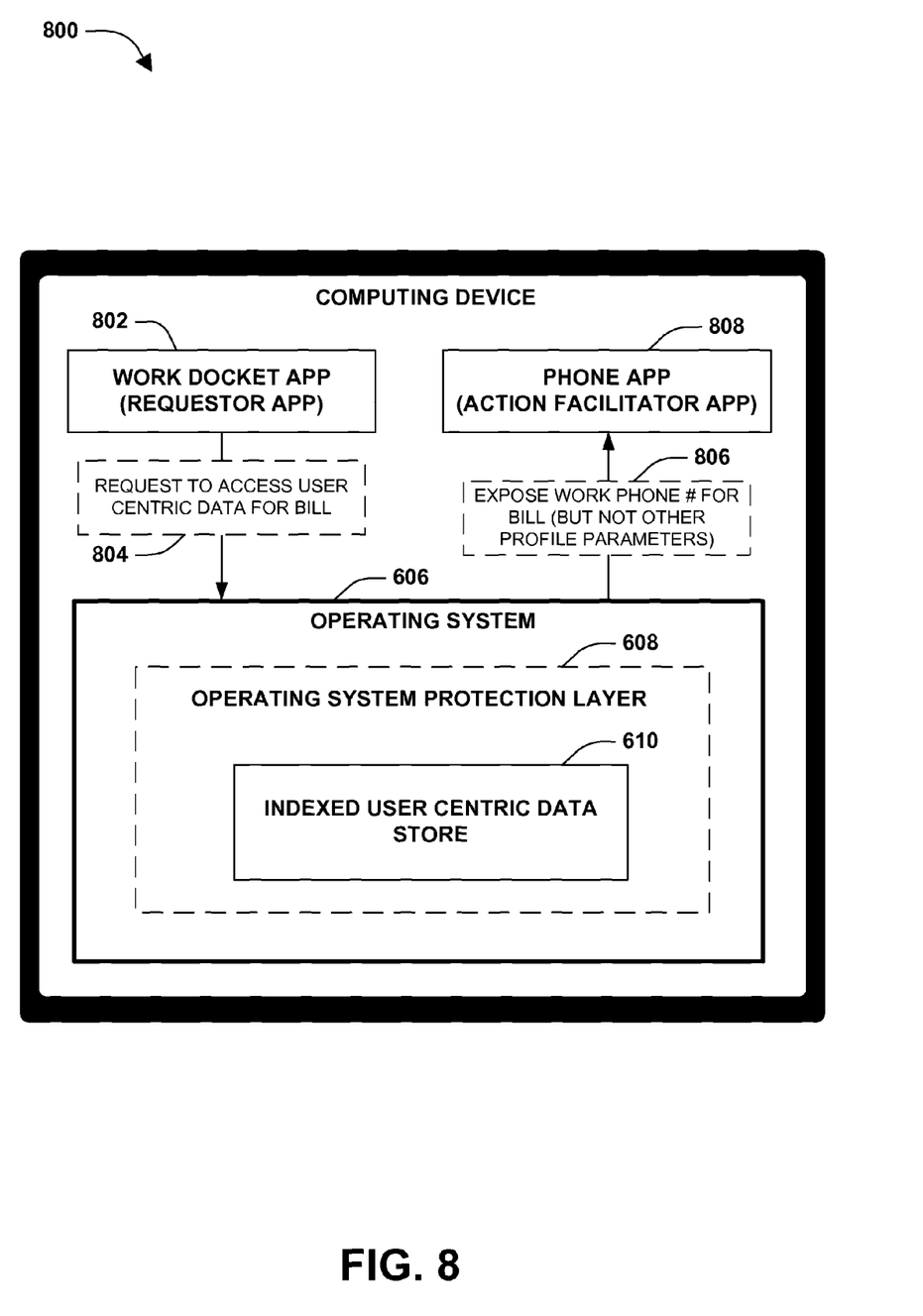
FIG. 8 is an illustration of an example of an operating system exposing a work phone number profile parameter of a second user centric profile to an action facilitator app.

FIG. 8 illustrates an example 800 of an operating system 606 exposing 806 a work phone number profile parameter of a second user centric profile to an action facilitator app. The operating system 606 (e.g., a user centric data broker) may maintain the second user centric profile and/or other user centric profiles within an indexed user centric data store 610. An operating system protection layer 608 may restrict unauthorized access to the indexed user centric data store.

In an example, a user of the operating system 606 may access a requestor app such as a work docket app 802 that may allow the user to manage office related information such as office productivity, office workloads, office tasks, meeting agendas, etc. The user may request, through the work docket app 802, to contact Bill. Because additional and/or useful contact information regarding Bill may be stored in the indexed user centric data store 610 (e.g., user centric data stored within a user centric profile for Bill may provide additional information about Bill not known to the work docket app 802 such as a work phone number), the work docket app 802 may send a request 804 to access user centric data, such as a user centric profile, for Bill. The request 804 may comprise a query parameter such as a work email address for Bill. The operating system 606 (e.g., the user centric data broker) may query the indexed user centric data store 610 using the query parameter in order to identify a user centric profile corresponding to the query parameter (e.g., the second user centric profile may match the work email address for Bill, and may comprise one or more profile parameters corresponding to user centric data for Bill such as the work phone number).

The operating system 606 may determine that the user wants to call Bill's work phone number (e.g., a call action may be specified within the request 804; the user may have selected a call action exposed to the user by the operating system 606 along with the work phone number for Bill; etc.).

The operating system 606 may determine that a phone app 808 may be an action facilitator app capable of performing the call action. Accordingly, the operating system 606 may expose 806 the work phone number for Bill to the phone app 808 so that the user can call Bill through the phone app 808. In an example, merely the work phone number is exposed to the phone app 808, and the phone app 808 may be restricted from accessing other profile parameters (e.g., a home address profile parameter for Bill). In this way, the operating system 606 may operate as a user centric data broker that provides a user with secure access to user centric data.

Figure 9:
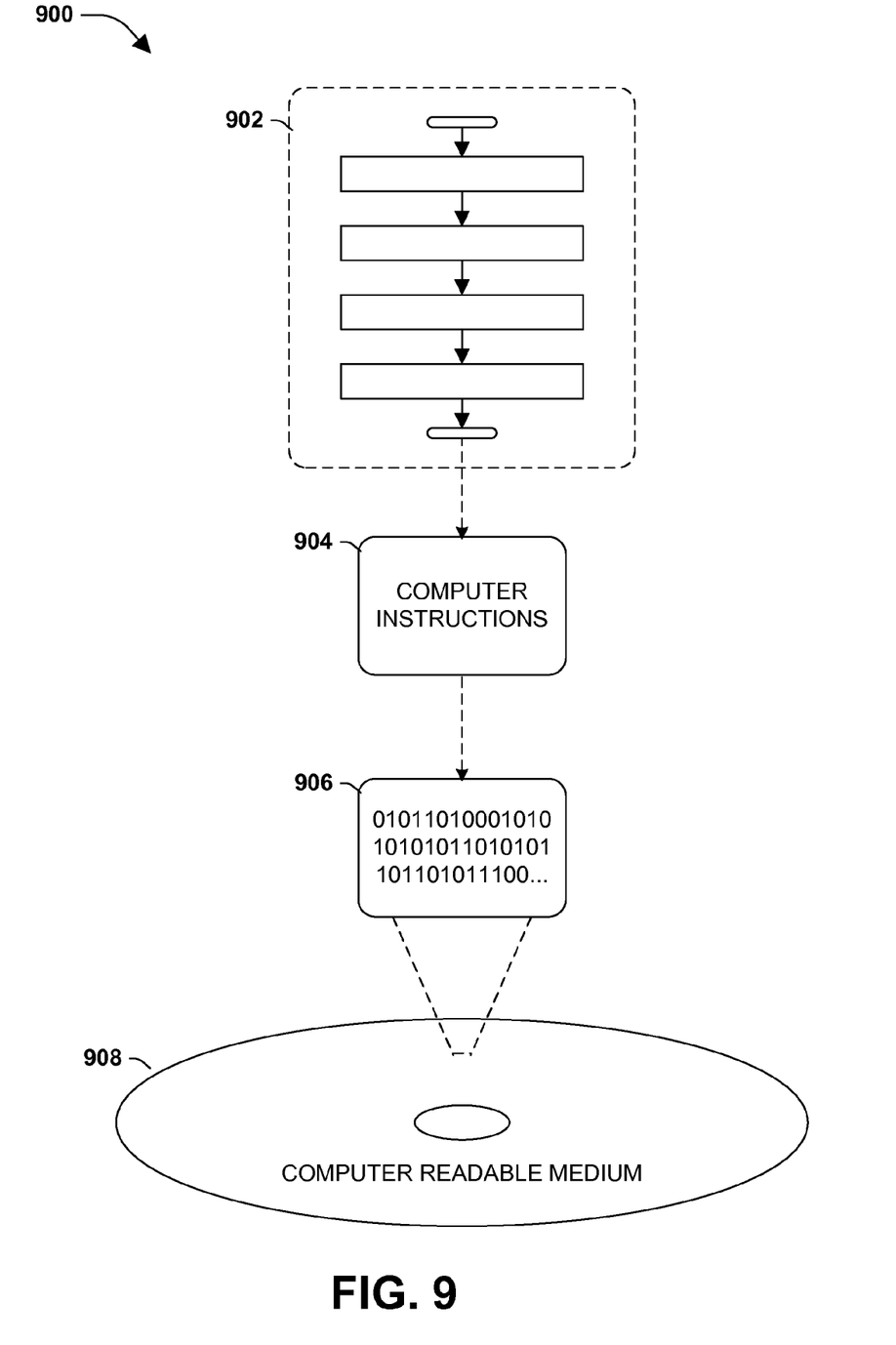
FIG. 9 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 9, wherein the implementation 900 comprises a computer-readable medium 908, such as a CD-R, DVD-R, flash drive, a platter of a hard disk drive, etc., on which is encoded computer-readable data 906. This computer-readable data 906, such as binary data comprising at least one of a zero or a one, in turn comprises a set of computer instructions 904 configured to operate according to one or more of the principles set forth herein. In some embodiments, the processor-executable computer instructions 904 are configured to perform a method 902, such as at least some of the exemplary method 100 of FIG. 1, for example. In some embodiments, the processor-executable instructions 904 are configured to implement a system, such as at least some of the exemplary system 300 of FIG. 3, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
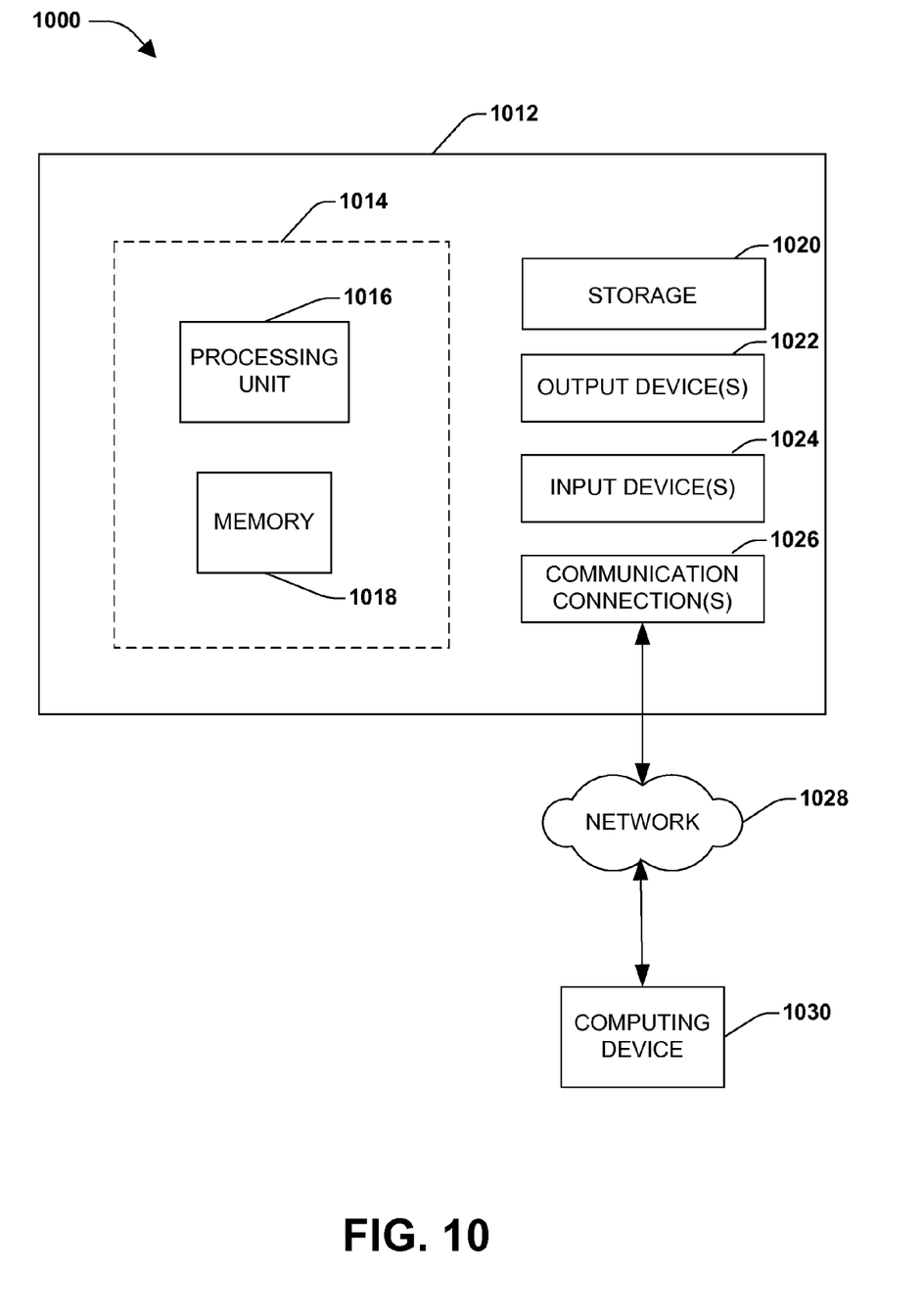
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 13104), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via a network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application.

What is claimed is:

1. A method for dynamically maintaining user centric data, comprising:

receiving a first user centric definition for first user centric data from a data provider app;

defining a first user centric profile for the first user centric data based upon the first user centric definition;

based at least on receiving a request that corresponds to the first user centric profile from a requestor app, determining, by an operating system maintaining the first user centric profile, whether the requestor app has permission to access the first user centric profile;

based at least on determining that the requestor app has permission to access the first user centric profile, allowing the requestor app to access the first user centric profile; and based at least on determining that the requestor app does not have permission to access the first user centric profile, displaying the first user centric profile via an operating system user interface of the operating system while restricting the requestor app from accessing the first user centric profile.

2. The method of claim 1, the first user centric data corresponding to user defined data.

3. The method of claim 1, the first user centric data corresponding to contact data.

4. The method of claim 1, the first user centric data corresponding to calendar data.

5. The method of claim 1, the displaying the first user centric profile via the operating system user interface further comprising:

presenting an action invokeable by a user upon the first user centric profile.

6. The method of claim 5, further comprising:

based at least on a selection, by the user, of the action:
identifying an action facilitator app capable of executing the action;

providing the action facilitator app with a first profile parameter within the first user centric profile based upon the first profile parameter corresponding to the action; and invoking the action facilitator app to perform the action utilizing the first profile parameter.

7. The method of claim 6, the providing the action facilitator app with the first profile parameter further comprising:

restricting the action facilitator app from accessing a second profile parameter within the first user centric profile based upon the second profile parameter not corresponding to the action.

8. The method of claim 5, the action corresponding to at least one of a call action, an email action, a social network action, a calendar action, a share action, a video call action, or a communication action.

9. The method of claim 1, further comprising:

based at least on receiving an update from the data provider app, updating the first user centric profile based upon the update, the updating comprising at least one of:

updating a first profile parameter within the first user centric profile;

adding a new profile parameter to the first user centric profile; or removing a second profile parameter from the first user centric profile.

10. The method of claim 1, wherein the first user centric profile further comprises a first profile parameter and a second profile parameter; and wherein the displaying the first user centric profile via the operating system user interface further comprises: presenting the first profile parameter within the first user centric profile before the second profile parameter within the first user centric profile based upon the first profile parameter being more recently used than the second profile parameter.

11. The method of claim 1, further comprising:

storing the first user centric profile within an indexed user centric data store, the indexed user centric data store comprising one or more user centric profiles associated with a user.

12. The method of claim 11, the request further comprising a query parameter, and at least one of the allowing the requestor app to access the first user centric profile or the displaying the first user centric profile via the operating system user interface further comprising:

querying the indexed user centric data store utilizing the query parameter to identify the first user centric profile based upon the query parameter corresponding to a user profile parameter within the first user centric profile.

13. The method of claim 1, the displaying the first user centric profile via the operating system user interface further comprising:

invoking the operating system to draw the operating system user interface within a requestor app interface of the requestor app, the operating system user interface not accessible to the requestor app.

14. The method of claim 1, the first user centric data corresponding to social network data.

15. A system for dynamically maintaining user centric data, comprising:

one or more processing units; and memory comprising instructions that when executed by at least one of the one or more processing units perform operations, comprising:

receiving a first user centric definition for first user centric data from a data provider app;

defining a first user centric profile for the first user centric data based upon the first user centric definition;

based at least on receiving a request that corresponds to the first user centric profile from a requestor app, determining, by an operating system maintaining the first user centric profile, whether the requestor app has permission to access the first user centric profile;

based at least on determining that the requestor app has permission to access the first user centric profile, allowing the requestor app access to the first user centric profile; and based at least on determining that the requestor app does not have permission to access the first user centric profile, displaying the first user centric profile via an operating system user interface of the operating system while restricting the requestor app from accessing the first user centric profile.

16. The system of claim 15, the first user centric profile owned by the operating system.

17. The system of claim 15, the displaying the first user centric profile via the operating system user interface further comprising:

presenting an action invokeable by a user upon the first user centric profile.

18. The system of claim 17, the operations further comprising:

based at least on a selection, by the user, of the action:

identifying an action facilitator app capable of executing the action;

providing the action facilitator app with a first profile parameter within the first user centric profile based upon the first profile parameter corresponding to the action; and invoking the action facilitator app to perform the action utilizing the first profile parameter.

19. A computer readable storage device comprising instructions which when executed by one or more processing devices perform a method for dynamically maintaining user centric data, comprising:

receiving a first user centric definition for first user centric data from a data provider app;

defining a first user centric profile for the first user centric data based upon the first user centric definition;

based at least on receiving a request that corresponds to the first user centric profile from a requestor app, determining whether the requestor app has permission to access the first user centric profile;

based at least on determining that the requestor app has permission to access the first user centric profile, allowing the requestor app access to the first user centric profile; and based at least on determining that the requestor app does not have permission to access the first user centric profile, displaying the first user centric profile via an operating system user interface of an operating system maintaining the first user centric profile while restricting the requestor app from accessing the first user centric profile.

20. The computer readable storage device of claim 19, the displaying the first user centric profile via the operating system user interface further comprising:

presenting an action invokeable by a user upon the first user centric profile.

* * * * *